(No Model.)
W. J. CORDLEY.
ELECTRICAL CONDUCTOR FOR THE TRANSMISSION OF POWER.
No. 427,746. Patented May 13, 1890.
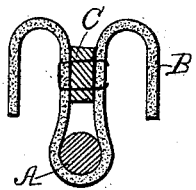
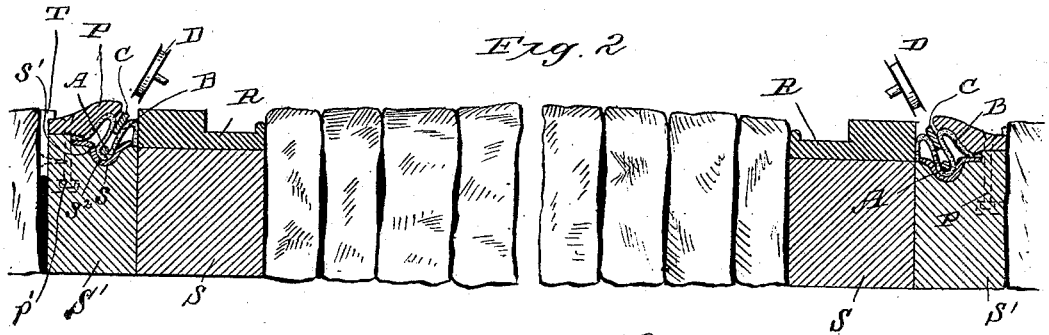
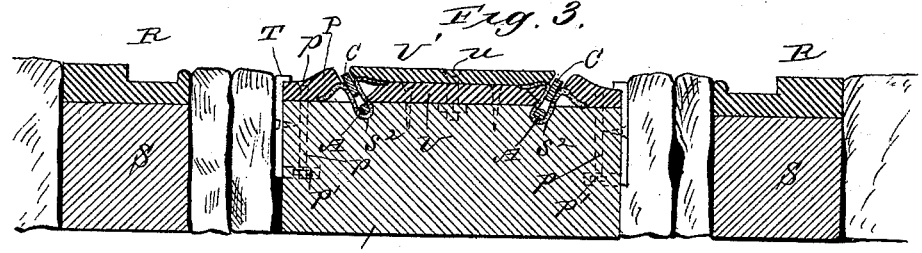
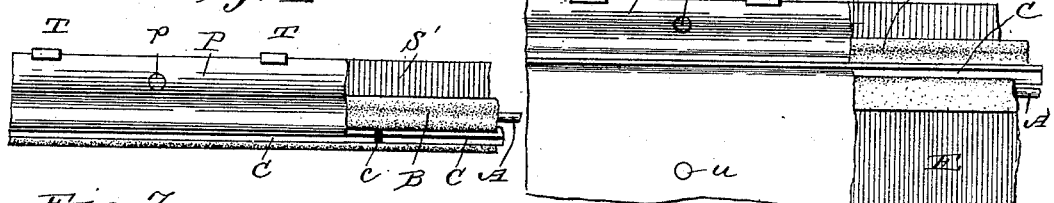
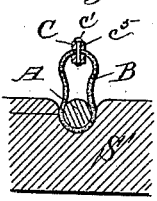
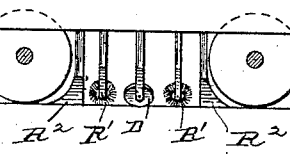
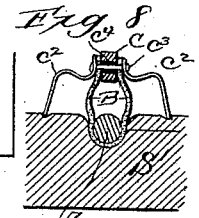
Witnesses
E. L. Smith
Thomas Durant
Inventor
Wm. J. Cordley
By his Attorneys
Church & Church

UNITED STATES PATENT OFFICE.

WILLIAM J. CORDLEY, OF RICHMOND, VIRGINIA, ASSIGNOR OF ONE-HALF TO WALTER D. MOSES, OF SAME PLACE.

ELECTRICAL CONDUCTOR FOR THE TRANSMISSION OF POWER.

SPECIFICATION forming part of Letters Patent No. 427,746, dated May 13, 1890.

Application filed August 6, 1889. Serial No. 319,896. (No model.)

*To all whom it may concern:*

Be it known that I, WILLIAM J. CORDLEY, of Richmond, in the county of Henrico and State of Virginia, have invented certain new and useful Improvements in Electric Conductors for the Transmission of Power; and I do hereby declare the following to be a full, clear, and exact description of the same, reference being had to the accompanying drawings, forming a part of this specification, and to the letters of reference marked thereon.

This invention relates to new and improved means for sustaining and protecting electric conductors and for establishing connection between an inclosed conductor and an external conductor or circuit, and, although susceptible of other uses, is more especially designed for application to electric railways for sustaining the circuit wires or conductors through which power is transmitted and delivered to the motor or other working circuit.

Broadly considered, said invention comprehends the employment of a conduit entirely surrounding the conductor, the latter being properly supported and insulated, and a second conductor extending through or forming a part of the wall of the conduit, and held normally out of contact with the inclosed conductor by yielding or elastic devices such as will permit said second conductor to be pressed temporarily in contact with the exposed surface of the main conductor and thereby establish communication with the exterior of the conduit.

The invention also embraces certain novel features of construction, all as hereinafter described, and pointed out in the claims.

In the drawings, Figure 1 is a transverse sectional view of the main and secondary conductors applied to an inclosing-envelope. Fig. 2 is a transverse sectional view of a portion of a road, showing one mode of applying and securing the conductors outside the rails. Fig. 3 is a similar view illustrating one mode of supporting the conductors in the road-bed between the rails. Figs. 4 and 5 are top plan views of the conductors shown in Figs. 2 and 3, respectively, the upper confining-plates being partially broken away to uncover the casing. Fig. 6 is a side elevation of the clearing devices and contact-wheel mounted upon the car. Figs. 7 and 8 are detail views.

Similar letters of reference in the several figures indicate the same parts.

The essential elements of my present invention, looking at it in its broadest aspect, are four in number, and they are represented in the preferred, though not the only, form of embodiment shown by the main conductor A, an enveloping tube or casing B, a contact-strip C, and a circuit-closer or trolley D. The main conductor A may be of any approved form in cross-section, properly insulated, but presenting an exposed or contact surface. The contact-strip C may be of any approved form and dimensions; but it is preferably constructed of flat metal and in short sections, the latter being insulated by the interposition of a non-conductor, as at $c$, between the ends of adjacent sections. The contact-strips C extend longitudinally of the exposed or uncovered face of the main conductor and project through the wall of the casing B, which latter, in connection with the contact-strips C, (or other form of conductor employed in lieu thereof,) entirely surrounds and envelops the main conductor, thus forming a closed conduit, within which the main conductor is held and protected.

Elastic or yielding devices are to be employed for supporting or holding the contact-strips C normally away from and out of contact with the main conductor, and in the present instance this operation is performed by the walls of the casing B, the latter being formed from a flexible sheet—such as rubber cloth—or a section of tubing re-enforced, if found desirable, by springs. When made in this form, the sheet or strip of flexible material is bent or pressed into the form of a gutter or U shape, and the main conductor A is placed therein, after which the strips C are inserted between the walls and at a suitable distance from the main conductor to prevent electrical connection when in normal position. The strips C are cemented to the walls to form a tight joint and the connection is re-enforced by the application of rivets, wires, threads, or equivalent fastenings extending through the sides of the sheet or conduit and the strip C. In this way the strip C is incorporated with and made part of the conduit. The upper edges of the sheet are bent or folded back, as shown, and confined and protected by suitable plates, as will be hereinafter explained.

The main conductor is placed in communication with the branch or working circuit through the instrumentality of a circuit-closer of conducting material, which is held in contact with strip C with sufficient force to compress or displace the yielding supports for said strip and place the latter in electrical contact with the main conductor. Such a circuit-closer is represented by the wheel or trolley D, which is suitably supported upon the car, so as to be permitted motion for adjustment toward and from the strip C. The circuit-closer is preferably provided with a wheel $d$, of conducting material, supported upon an axle between two insulating-disks $d'$.

One mode of adapting my improved conduit to street-railways, as ordinarily constructed, is illustrated in Fig. 2, wherein S designates the stringers, and R the rails. Along the outside of the stringer S is secured a supplemental stringer or support S', having in its upper surface a longitudinal groove or recess $s$ for the reception of a sustaining-plate $s'$. The inner edge of the plate $s'$ is adapted to engage one of the bent edges of the sheet forming the casing and to clamp and hold it against the side of the rail or stringer, thus forming a tight joint at this point, and at the same time retaining that side of the casing in position. The plate $s'$ is also provided with a longitudinal recess or groove $s^2$, somewhat deeper than the thickness of the conductor A and its elastic insulating-covering, so that when the conductor is placed above said recess and pressed down it will be crowded and held securely in place within said recess.

Above the outer edge of the sheet forming the casing is secured a protecting-plate P, whose upper face is inclined outwardly from the rail, its inner edge overhanging the conduit and leaving a narrow opening between the plate and the outside of the rail to accommodate the circuit-closer D. The upper face of this plate is beveled, as indicated, to divert water, dirt, &c., from the slot between said plate and the rail. The plate P is formed in sections of convenient length, and is held firmly in place against lateral displacement by bolts $p$, preferably threaded into nuts $p'$, inserted through lateral openings in the stringer S'. Clips T, overlapping the outer edge of plates P and secured to the stringer S', assist in retaining said plates firmly in position. The outer edge of the sheet forming the conduit is clamped between the plate P and top of the stringer or of plate $s'$, thus forming a close joint and excluding dirt and water from the opening on each side of the casing to accommodate the lateral displacement which takes place when the strip C is pressed down in contact with the main conductor A.

When two main circuit-conductors are to be employed, they may either be located outside the rails, as described, or between the rails, the latter adaptation being represented in Fig. 3, wherein E represents a longitudinal stringer or support containing two recesses or grooves $s^2$ for the reception and retention of the main conductors A and their flexible insulating-covering or conduit. The outer edges of the conduits are held and protected by plates P, similar to those in Fig. 2, and held in place by clips T and bolts $p$.

The inner edges of the flexible sheets are received and clamped between plates U U'. The plate U is bolted upon the stringer with its edges slightly overlapping the conductors A, to insure their retention in the grooves, and the upper plate U' is clamped upon the lower plate U, as by bolts $u$, passing through both plates and threaded into nuts below plate U. The plates P and U' extend partially over and protect the conduit, a narrow slot being left between the adjacent edges of said plate for the introduction and passage of the circuit-closer D.

The car or other traveling body is furnished with suitable clearers or plows $R^2$ and brushes R', for removing obstructions and clearing the slots in which the circuit-closers work.

The conduits are preferably so arranged that the contact-strips C will stand at an angle to the vertical with relation to the main conductor A, thus affording a more complete protection and rendering the accidental closing of the circuit practically impossible, as the slot formed between the protecting-plates or between the latter and the rail can be made very narrow, of just sufficient width to accommodate the circuit-closer D, which latter is also arranged at an angle and moved in a direction to press the strip or other intermediate conductor C into contact with the conductor A. Thus in the illustration Fig. 7, instead of inserting the contact-strip C between the sides of a folded strip, as in Fig. 1, the casing is made in the form of a closed tube, and strips $c^5$ are applied to the opposite surfaces and connected by rivets $c'$ or other fastenings of conducting material passing through the wall of the casing, so that the two strips $c$ become in effect a single contact-strip.

Instead of bending the edges of the casing back on either side, as indicated in Fig. 1, to assist in supporting the contact-strip, they may terminate at the top or sides of the contact-strip C, as illustrated in Fig. 8, in which event additional support for the strip C may be obtained, if desired, by applying springs $c^2$ on either side of the casing. The lower portions of these springs $c^2$ are bent outward from the casing and rest upon or are secured to a suitable supporting-base, while the upper ends of the springs are attached to the sides of the casing in proximity to the contact-strip C they are designed to support. Thus the upper ends of the springs may be attached by pins or rivets $c^3$, extending through the strip C, and if the fastening devices are of conducting material it is preferred that they should be insulated from the strip C, as indicated at $c^4$, by a block of non-conducting material inserted in said strip.

Having thus described my invention, what I claim as new is—

1. The combination of the closed conduit or casing of flexible insulating material, the main conductor A, supported within and held to one side of the interior of said casing, and the contact-strip extending through the wall of the casing and secured to the latter opposite the main conductor, substantially as described.

2. The combination of the flexible conduit containing a contact-strip projecting through the wall thereof, a main conductor A, supported and inclosed within said conduit and held normally removed from said contact-strip, a grooved support embracing a portion of the conduit to confine the main conductor, elastic supports for the contact-strip, and a movable circuit-closer adapted to engage said strip and press its inner surface against the main conductor, substantially as described.

3. The combination, with the main conductor A, of an inclosing casing or conduit formed from a sheet or strip of flexible non-conducting material bent or folded in trough form to receive the main conductor, and having the sides secured to an interposed contact-strip, while the edges are bent or folded back and secured to a support, substantially as described.

4. The combination, with a casing composed of a strip or sheet of flexible non-conducting material bent or folded in trough form, in cross-section, with the edges folded back, a main conductor A, extending longitudinally of the casing and lying in the trough, a contact-strip inserted between the sides of the trough and secured to the walls thereof, so as to form a water-tight joint, said contact-strip being supported out of contact with the main conductor, a support for the casing to clamp the latter upon the main conductor and hold the latter in position, clamps engaging the edges of the strip forming the casing, and protecting-plates overlying the casing, but leaving the surface of the conducting-strip exposed for co-operation with a circuit-closer, substantially as described.

5. In combination with the rail and its supports, a stringer held parallel with the rail and provided with a grooved plate, a flexible conduit or casing such as described, containing the main conductor and a contact-strip, one edge of said casing being clamped by the grooved plate, and a protecting-plate, as at P, partially overlapping the casing, engaging the edge thereof, and secured to the stringer, substantially as described.

6. In combination with a railway-rail, a stringer supported parallel therewith, a main conductor supported within a casing carrying a contact-strip, such as described, adjacent the rail, and a protecting-plate bolted to the stringer and provided with a retaining-clip at the outer edge, while its inner edge partially overlaps the conductor and its casing, leaving a narrow space or slit next the rail for the insertion of the circuit-closer, as and for the purpose specified.

7. In a railway, and in combination with the rails and a vehicle adapted to travel thereon, a conductor A, extending parallel with the rails and supported within an inclosing-casing provided with movable contact-strips, a protecting-plate overlying said casing and conductor, and a circuit-closer movable in a plane at an angle to the vertical and engaging the contact-strips to press the latter against the main conductor within the casing, substantially as described.

8. In combination with the stringer, having a longitudinal groove or recess in its surface, the flexible casing or conduit seated in said groove, the conductor A, located within the casing and held between the walls of said groove or recess, contact-strip connected in the casing to form a closed conduit, said strip being held removed from the conductor A and to one side of a vertical line drawn through said conductor, a protecting-plate extending over the conduit, and an angularly-disposed circuit-closer with insulated sides, adapted to engage the contact-strip and press the latter against the main conductor.

9. In combination with the rail and stringer S', the sustaining-plates s' applied to the stringer, and the flexible conduit with its rearwardly-inclined edges and contact-strip, one of said edges being clamped and held against the rail for its support by the plate s' and the other edge held by a protecting-plate P, partially covering the conduit and secured to the stringer, a space or slot being formed between the rail and said plate P for the insertion and withdrawal of the circuit-closer, substantially as described.

10. In combination with the stringer upon which the conduit and its contained conductor are supported, a plate, such as P, overlying the conduit and held firmly in position against lateral displacement by bolts passing through said plates and engaging nuts in the stringer, and a clip applied along the outer edge of said plate and secured to the stringer, substantially as described.

11. In combination with the main conductor, an envelope or casing of flexible insulating material embracing said conductor for a portion of its circumference, having a longitudinal section of the surface uncovered, and a contact-piece applied to the flexible casing and projecting therethrough, said contact-piece being held normally removed from, but in position to engage, the uncovered surface of the main conductor within the casing, substantially as described.

WILLIAM J. CORDLEY.

Witnesses:
LOUIS J. HEINDE,
W. F. REDDY.